United States Patent [19]

Kulikauskas

[11] Patent Number: 4,704,519

[45] Date of Patent: Nov. 3, 1987

[54] SELECTIVE CODE READER

[75] Inventor: Joseph A. Kulikauskas, Elmira, N.Y.

[73] Assignee: Emhart Industries, Inc., Farmington, Conn.

[21] Appl. No.: 876,038

[22] Filed: Jun. 19, 1986

[51] Int. Cl.$^4$ ............................................. G06K 19/06
[52] U.S. Cl. ...................................... 235/494; 235/472
[58] Field of Search ................................. 235/472, 494

[56] References Cited

U.S. PATENT DOCUMENTS 4,644,151  2/1987  Juvinall ............................... 235/494

Primary Examiner—Harold I. Pitts
Attorney, Agent, or Firm—Arthur B. Moore; Arthur J. Samodovitz

[57] ABSTRACT

A selective bar code reader distinguishes code data from other data obtained from a carrier before reading the data. The selective bar code reader comprises a scanner for generating electrical signals having a first portion representing the code and a second portion representing other regions on the carrier, a processor for generating an electrical waveform having a first portion corresponding to the first portion of the electrical signals and having a fundamental frequency corresponding to the spacing between the bar code elements and a second portion corresponding to the second portion of the electrical signals and not having a fundamental frequency corresponding to the spacing between the elements of the bar code. The electrical waveform is passed through a band pass filter centered at the fundamental frequency to attenuate the second portion of the electrical waveform and thereby to identify the first portion of the electrical waveform and the bar code data.

19 Claims, 14 Drawing Figures

SELECTIVE CODE READER

BACKGROUND OF THE INVENTION

The invention relates generally to selective code reading apparatus and processes and deals more particularly with apparatus and processes for locating a code on a carrier and then reading the code.

One application among many for the invention is to locate and read a bar code on a container. The bar code may take the form of a series of substantially uniformly spaced, short and long bars arranged substantially parallel to one another on the sidewalls of the container. The code may contain a variety of information such as a mold number from which the container was formed.

A system for reading such a bar code is disclosed in U.S. patent application Ser. No. 648,229, filed Sept. 7, 1984 by Hans Martin and entitled "APPARATUS FOR READING A LINE MARKING". This patent application is assigned to the assignee of the present invention and hereby incorporated by reference as part of the present disclosure. The code reading system of the 648,229 patent application comprises a light source which illuminates the code as the container is rotated, and a linear array of optical sensors which is positioned for lengthwise illumination by reflections from each bar as the container is rotated. When any one of the sensors is activated by a reflection, measurement circuitry is activated to count the total number of sensors in the array which are simultaneously activated by the reflection. The number indicates the length of the bar or other source of reflection. Count values within a first range indicate long bars of one binary level while count values within a second range indicate short bars of the other binary level.

Sometimes however, stray marks, container imperfections or lettering occur outside the code region but within the line of sight of the optical sensors and yield readings which may be confused with the bar code.

Accordingly, a general object of the present invention is to provide a selective code reading apparatus and process which can locate a code on a carrier and distinguish it from lettering or other marks on the carrier.

A more specific object of the present invention is to provide a selective code reading apparatus and process of the foregoing type which cooperates with a bar code reader to read the code.

Another specific object of the present invention is to provide a bar code reader which can read different types of bar codes having short and long bar elements which vary in length from type to type.

SUMMARY OF THE INVENTION

The invention resides in apparatus and processes for locating a code containing a plurality of substantially uniformly spaced elements on a carrier and then reading the code. The apparatus comprises a scanner for scanning the carrier to yield electrical signals having a first portion representing a region on said carrier containing the code and a second portion representing other regions on the carrier, a processor for developing an electrical waveform having a first portion corresponding to said first portion of said electrical signals and having a fundamental frequency corresponding to the spacing between the elements of the code and a second portion corresponding to the second portion of the electrical signals and not having a fundamental frequency corresponding to the spacing between the elements of the code. The first and second portions of the electrical waveforms are filtered to attenuate the second portion of the electrical waveform relative to the first. The first portion of the electrical waveform is distinguished by its higher energy after filtering and it indicates the first portion of the electrical signals and the code data.

DETAILED DESCRIPTION OF THE PREFERRED EMBODIMENT

Figures 1, 2:
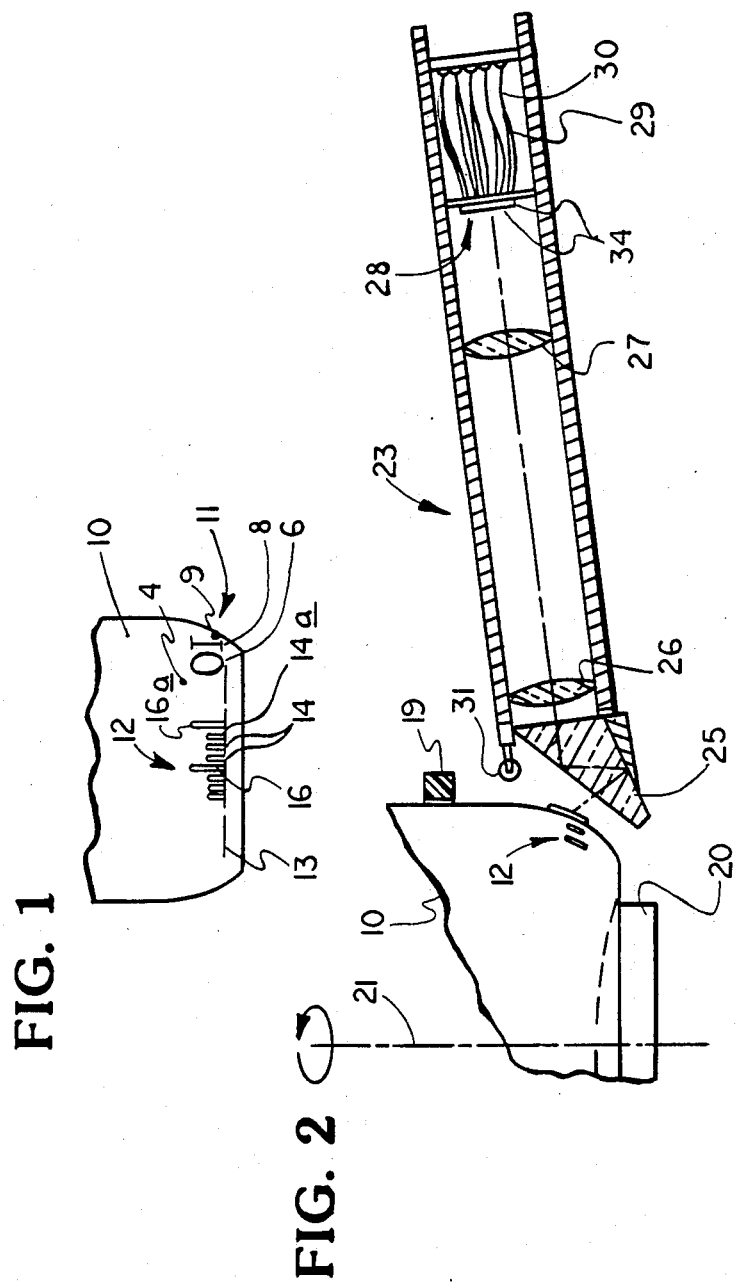
FIG. 1 is a side view of the lower part of a container having a bar code which may be located and read by the present invention.
FIG. 2 is a schematic view showing the container of FIG. 1 turned 90° to face an optical scanning device in accordance with the present invention.

FIG. 1 illustrates a bar code 12 located on a sidewall 10 of a glass container 11 which bar code may be located and read by the present invention. The bar code comprises shorter elements 14, 14 and longer elements 16, 16 which are substantially parallel to and uniformly spaced from one another. The elements 14 and 16 are also registered along an imaginary baseline 13. The lengths of the elements 14 and 16 indicate respective binary levels and the code 12 provides eight bits of information. FIG. 1 also illustrates a stray mark 4 and lettering 6, 8 and 9 on the sidewall 10 at approximately the same height as the bar code 12.

FIG. 2 illustrates a base 20 for supporting the container 11 at a scanning site adjacent to an optical scanning head or assembly 23 so that the assembly 23 peers at the level of the code 12. The scanning assembly 23 comprises a light source 31 which illuminates the code. As shown in FIG. 2, the bar elements 14 and 16 protrude outwardly from the sidewall 11 to form optical reflectors. Light reflects from the code through a prism 25, a first lens assembly 26, a second lens assembly 27 and then onto a reading surface 28. The reading surface is divided into a plurality of sectors 34, 34 arranged in a linear array. By way of example, there may be ten such sectors and the longer bar elements 16, 16 span seven of such sectors 34, 34 while the shorter bar elements 14, 14 span three of such sectors 34, 34 when the reflections from the bars are longitudinal of the reading surface 28. Each sector 34, 34 of the reading surface is formed by an inlet to a glass fiber 29 of a bundle 30. An outlet of each of the glass fibers interfaces to an associated photodiode 35, 35. Consequently, when a reflection from any of the bars or other reflective region on the container 11 strikes the optical reading surface 28, light is transmitted to the associated photo-diodes and activates them.

FIG. 2 also illustrate a belt 19 which engages the container 11 and rotates it about an axis 21 so that the optical scanning assembly successively scans each bar of the code 12. Because the containers may be randomly, angularly oriented on the base 20, the container may be rotated 360° or more to ensure that the entire code is scanned. The 360° rotation also causes the assembly 23 to scan the stray mark 4 and the lettering 6, 8 and 9. The speed of rotation is either substantially constant while the bar code is read or the speed of rotation is monitored during the scanning process so that the time interval between the scanning of bar elements may be correlated to the distance between the bar elements 14 and 16 on the container. For further details of portions of such an optical scanning assembly and associated reading technique, reference may be made to U.S. Pat. No. 4,524,270 to Martin which issued June 18, 1985, is assigned to the assignee of the present invention and is hereby incorporated by reference as part of the present disclosure.

Figure 3:
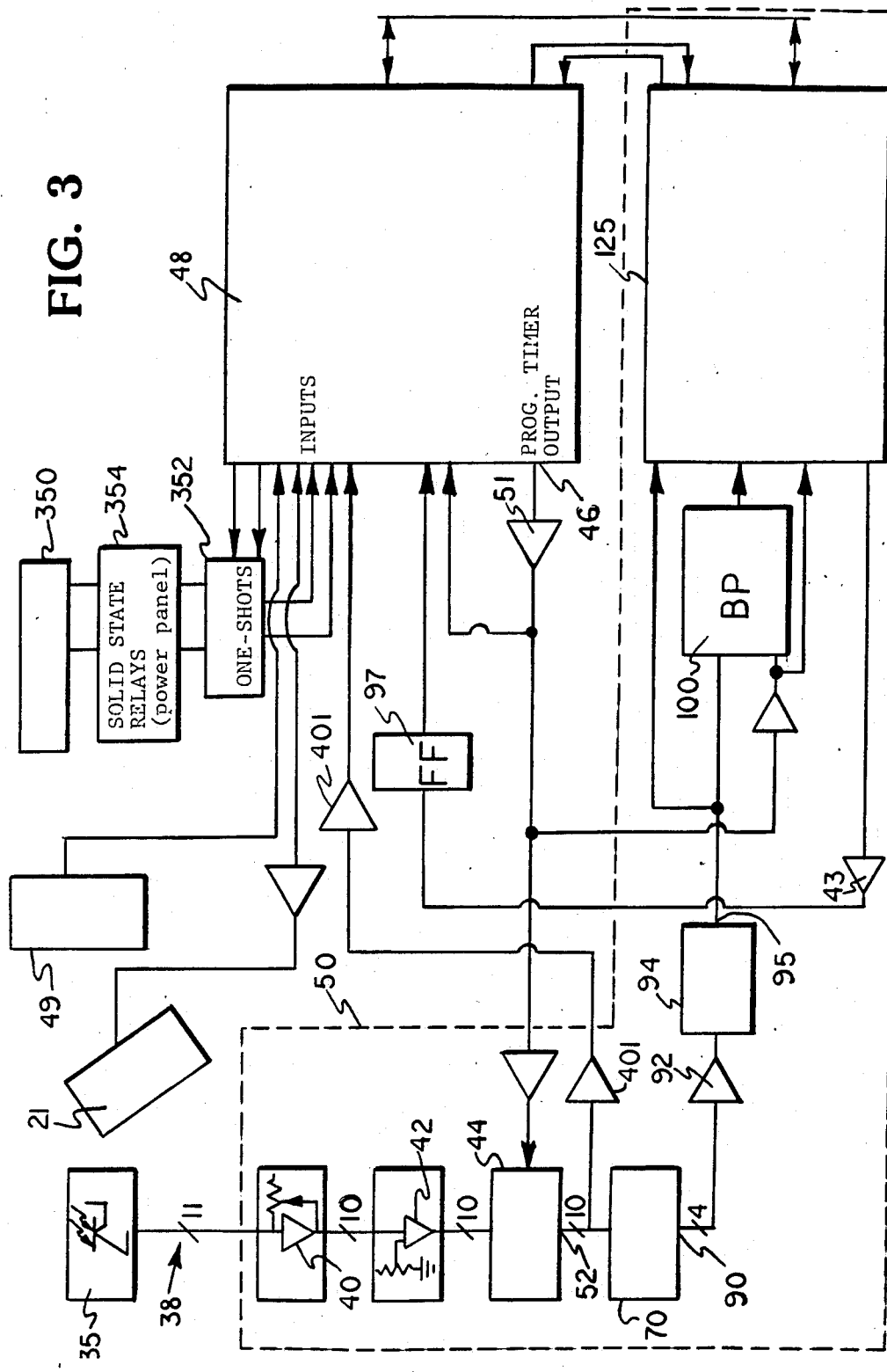
FIG. 3 is a block diagram of a processor and the optical scanning device of FIG. 2 which processor is utilized in the present invention to locate and read a code on a carrier.

Focusing now on the present invention, FIG. 3 illustrates an electronic processor 50 which senses the outputs of the photosensitive elements 35, 35 as the container 11 is rotated, locates the code, and then reads the information in the code as discussed below. An input of each diode 35 (only one shown in FIG. 3) is connected to a D.C. voltage source and the output is connected via a cable 38 to an analog amplifier 40 (only one shown in FIG. 3). To correspond to the ten sectors 34, 34 in the aforesaid example, there are ten photo-diodes 35, 35, ten associated conductors in the cable 38, one for each photo-diode, and ten amplifier channels. However, it should be clearly understood that if desired, a different number of sectors 34, 34, photo-diodes 35, 35, etc. could be used. The gain of each amplifier is adjustable to match the sensitivity of the associated photo-diode to the other photo-diodes. An eleventh conductor in the cable 38 brings the D.C. voltage to the input of each photo-diode. The outputs of the ten amplifier channels are supplied individually to ten comparators 42, 42 (only one shown) which compare each of the amplifier outputs to a threshold level. When the output exceeds the threshold level, this indicates a reflection at or above the level caused by the bar elements 14, 16. However, the stray mark 4 and lettering 6, 8 and 9 also cause a reflection above the threshold.

Figure 4A:
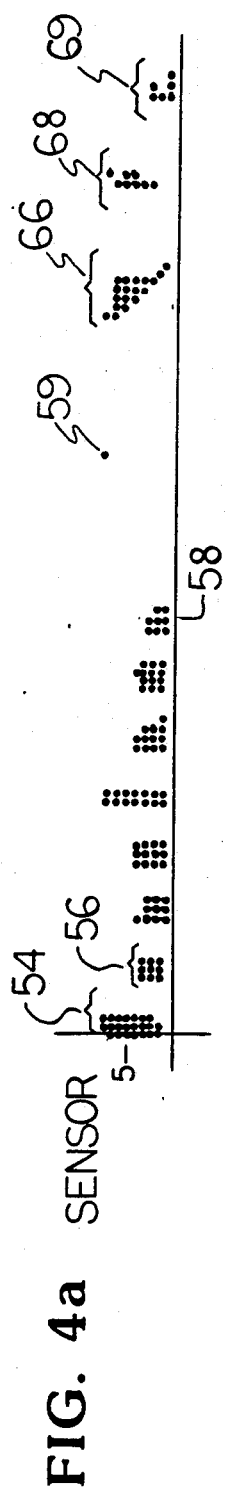
FIGS. 4(a)-(d) illustrate electrical signals obtained from the processor of FIG. 3 after various stages of processing.

The outputs of the comparators 42, 42 are fed in parallel to the inputs of a ten bit latch 44. By way of example, the latch is "D-type" and is triggered to read the comparator outputs by a sampling clock signal provided by an output 46 from a microprocessor 48 via buffers 50, 50. The microprocessor 48 begins to generate such clock signals after a rotation sensor 49 indicates that a container is currently being rotated by the belt 19. Also by way of example, the latch 44 is periodically triggered eight times during the time it takes for the container 11 to rotate past the optical scanning assembly 23 from one bar element in the code to the adjacent bar element in the code. Consequently, during a scan of the entire code 12 having eight bar elements, the latch 44 is triggered sixty-four times so that sixty-four scan samples are obtained. Also by way of example, the code length may be such that the aforesaid sampling rate yields 600 samples per 360° rotation of the container. Because the data from the photo-diodes 35, 35 is fed in parallel to the latch via the amplifiers 40, 40 and the comparators 42, 42, a collective, ten bit Sensor output 52 of the latch 44 instantaneously shows the length of any element currently being reflected onto the reading surface 28. The Sensor output 52 of the latch 44 is illustrated in FIG. 4(a) as a function of time and particularly shows which photo-diodes 35, 35 are activated during each clock sample. In the illustrated example, a first group 54 of points on the graph of FIG. 4(a) represents the response of the photo-diodes 35, 35 when scanning a first one of the bars 16a. The bar 16a is one of the longer variety and it caused a reflection which entered seven of the sectors 34, 34 in the reading surface 28 during each sample. During the first two samples, diodes 1–7 were activated and during the latter two samples, diodes 2–8 were activated. The offset of the bar is possibly due to vertical vibrations of the container during the scanning. A second group 56 of points on the graph of FIG. 4(a) indicates the response of the photo-diodes when a second, shorter one of the bar elements 14a is being scanned. The shorter bars reflect onto approximately three of the reading sectors 34, 34. It should also be noted that the group 56 contains only three samples in which the bar 14a reflected onto the reading surface while the group 54 contains four samples. This may indicate non-uniformity in width between the bars 14a and 16a caused by manufacture tolerances. The other points on the graph of FIG. 4(a) up until sample number 58 indicate the remainder of the bar code while a point 59 indicates a reflection from the stray mark 4 and groups of points 66, 68 and 69 on the graph indicate the response of the photo-diodes 35, 35 to the portions of letters 6, 8 and 9, respectively. It should be noted that the bar element representations on the graph of FIG. 4(a) are approximately periodic, that is, the bars occur at approximately equal time intervals while the representations of the stray mark 4 and letters 6, 8 and 9 do not occur at equal time intervals.

Figure 4B:
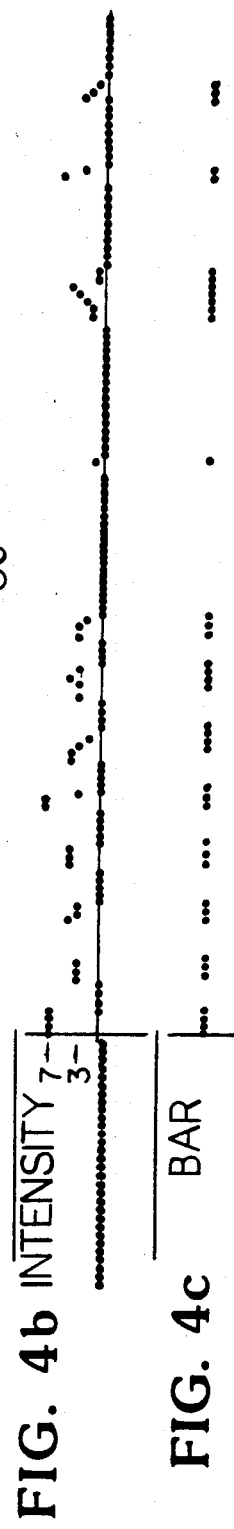
Figure 5:
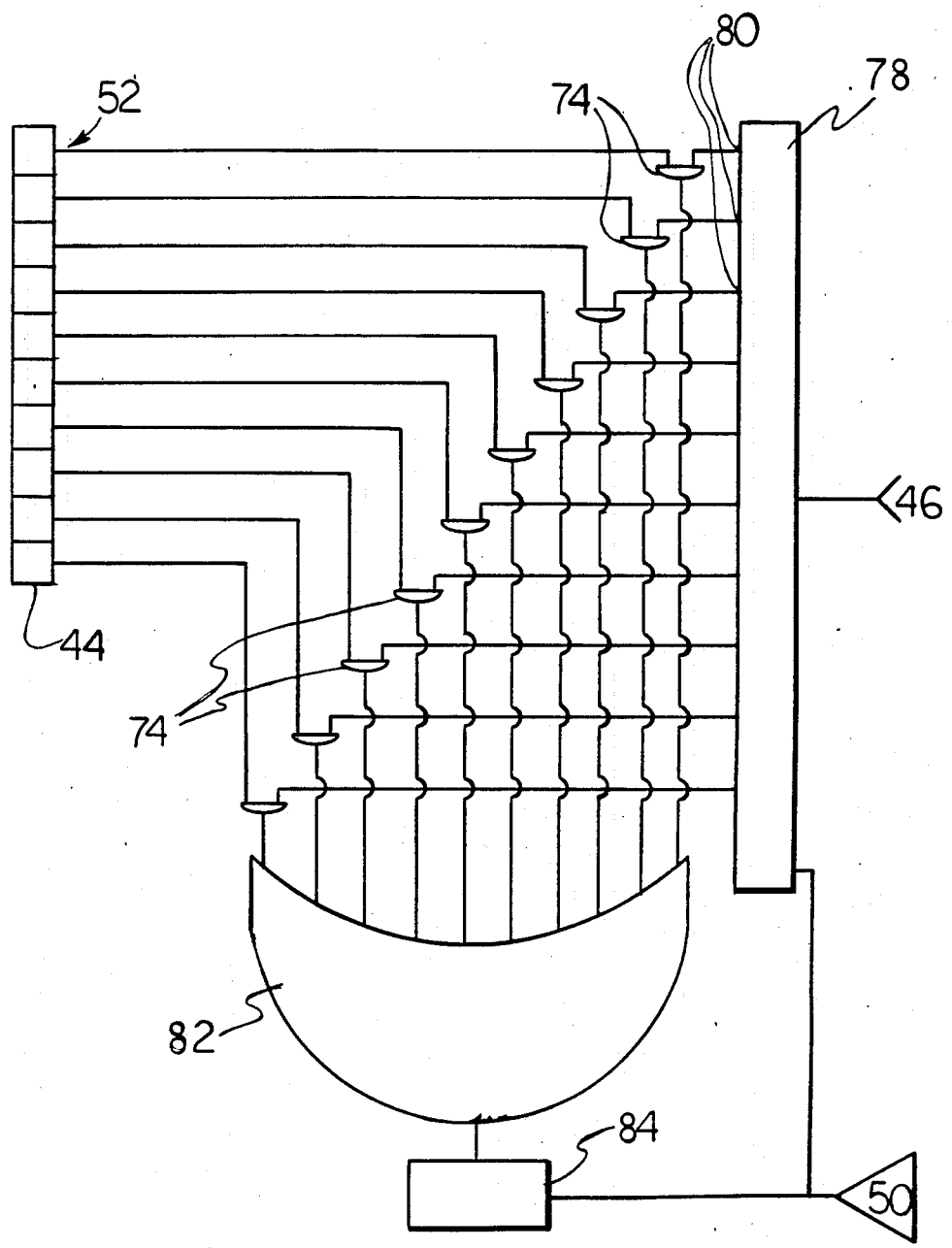
FIG. 5 is a schematic diagram of a sub-circuit within the circuitry of FIG. 3.

Referring again to FIG. 3, the parallel outputs 52 of the latch 44 are supplied to coding circuitry 70 which, for each sample of the latch 44, counts the number of photo-diodes which are activated. The circuitry 70 is shown in more detail in FIG. 5; however, it should be understood that other types of hardware counting circuitry or counting software in a computer can be utilized instead. In the FIG. 5 circuitry, the outputs of the latch 44 are applied to first inputs of ten AND gates 74, 74. A pulse sequencer 78 receives pulses from the clock signal output 46 and routes the pulses sequentially to its outputs 80, 80. The outputs 80, 80 are supplied to second inputs of the AND gates 74, 74 so that the outputs 52 of the latch 44 are read sequentially by the AND gates 74, 74. The outputs of the AND gates 74, 74 are supplied to a ten input OR gate 82 and the output of the OR gate 82 is supplied to a count input of a counter 84 so that during each cycle of the pulse sequencer 78, each of the outputs of the latch 44 is read and each output which indicates an activated photo-diode causes the OR gate 82 to output a pulse and the counter to increment by one. An "Intensity" output 90 of the counter 84 comprises four bits which indicate the number of activated photo-diodes during each sample. This output is illustrated in FIG. 4(b) as a function of time or sample number. Each of the columns in group 54 of FIG. 4(a) yields a count of seven while each of the columns in the group 56 yield a count of three. The bottle imperfection 4 yields a count of one while the lettering 6, 8 and 9 yield counts of one to six.

Figure 4C:
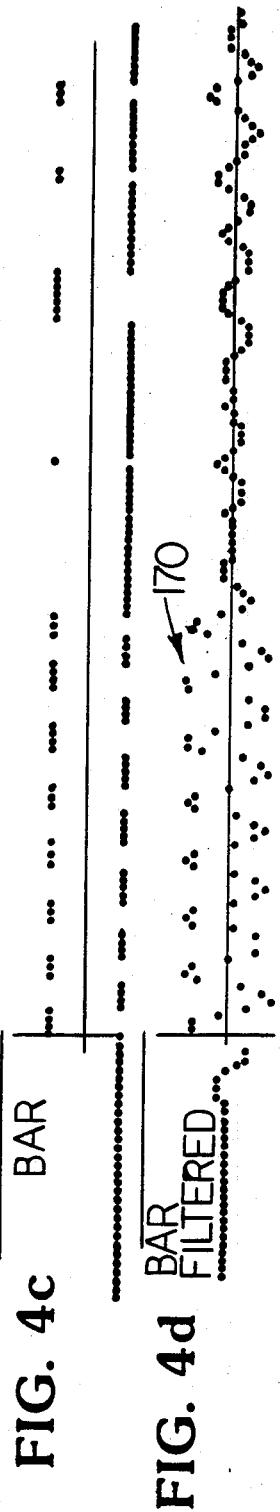

Referring again to FIG. 3, the "Intensity" output 90 is fed directly into a microprocessor 125 for storage and also through a buffer 92 into a digital comparator 94. If the count value is greater than zero, then the comparator outputs a "Bar" value 95 of plus one volt and if the count output is equal to zero, then the comparator outputs a "Bar" value 95 of minus one volt as illustrated by the "Bar" graph of FIG. 4(c). It should be noted that after the processing provided by the comparator 94, the bar code 12 yields a square wave having a fundamental frequency corresponding to the rate at which the bars 14, 16 successively reflect onto the reading surface 28, in other words, a square wave period equal to the center spacing of the bars divided by the peripheral speed of the container 11 during rotation. The stray mark 4 and the lettering 6, 8 and 9 yield non-periodic pulses of non-uniform width.

Figure 6:
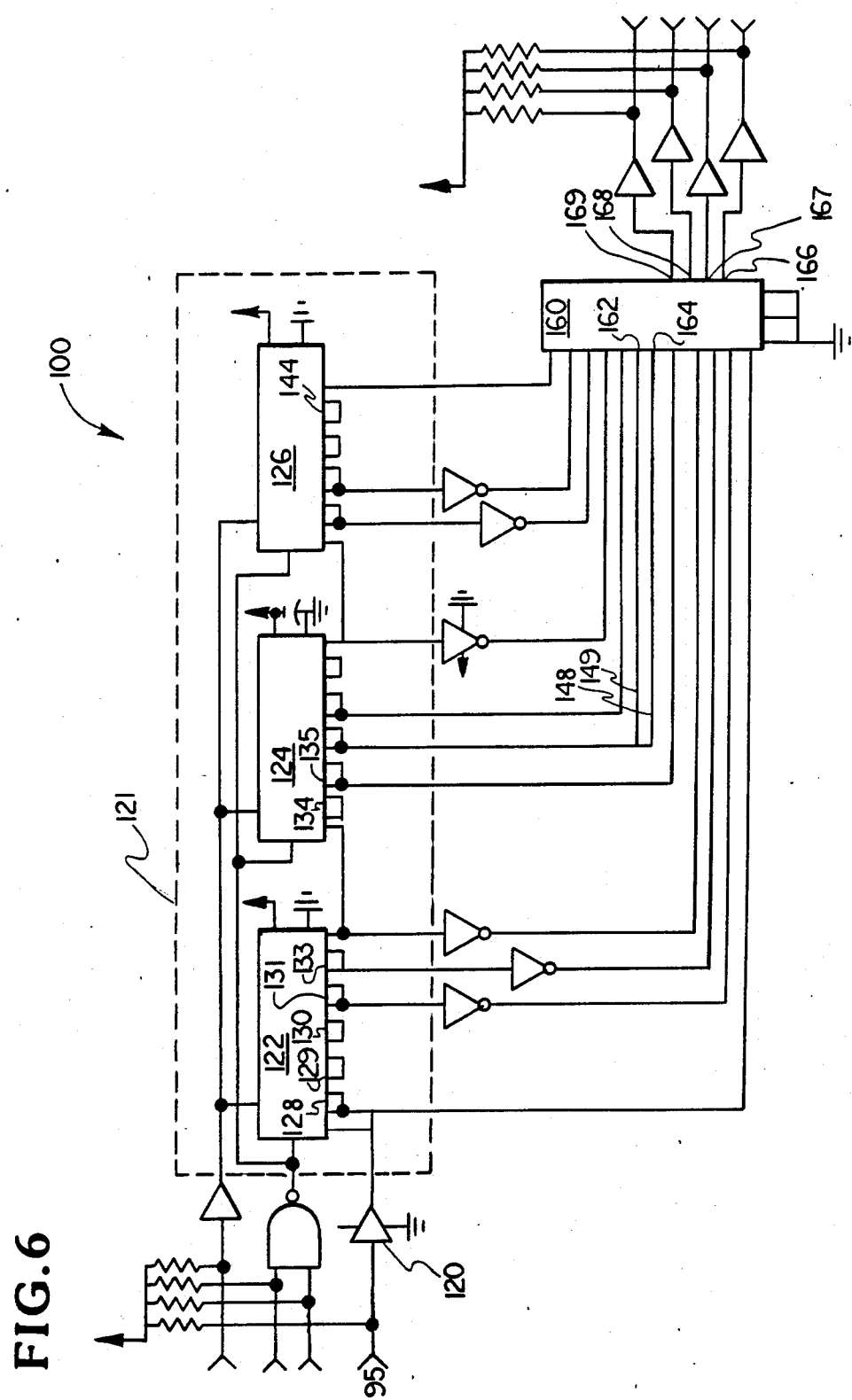
FIG. 6 is a circuit diagram of a digital band pass filter utilized in the circuitry of FIG. 3.
Figure 7A:
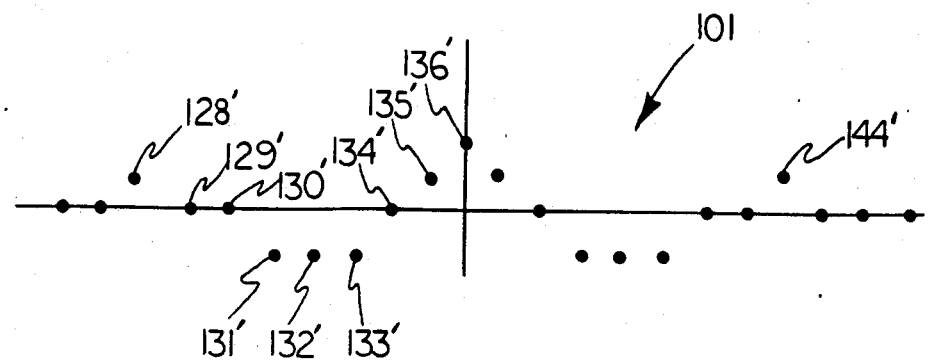
FIGS. 7(a) and 7(b) are graphs illustrating the operation of the digital band pass filter of FIG. 6.
Figure 7B:
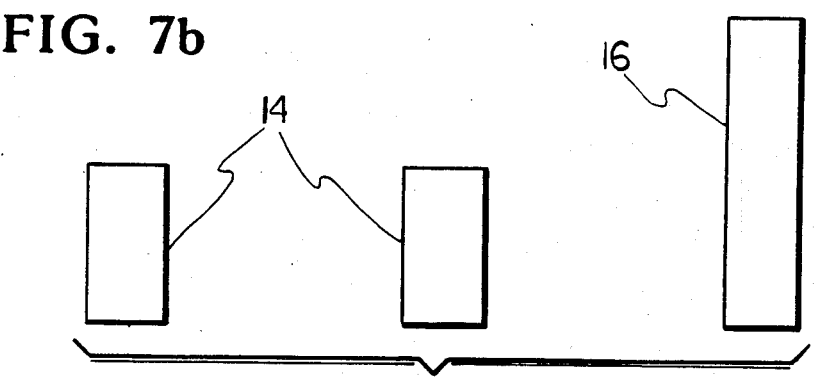

The output of the comparator 94 is supplied to a band pass filter 100 which is centered at the aforesaid fundamental frequency of the bar elements 14 and 16. By way of example, a suitable band pass filter is illustrated in FIG. 6. However, it should be understood that other types of band pass filters such as analog ones utilizing resistive, capacitive and inductive elements may be utilized instead if desired. The mode of operation of the band pass filter 100 can be understood with reference also to FIGS. 7(a) and (b) which show a finite impulse response 101 having a fundamental frequency equal to that of the "Bar" square wave. FIG. 7(b) illustrates that the time between scanning of the bar elements equals the fundamental "period" of the damped sinusoidal wave form of the finite impulse response. Each discrete point on the finite impulse response graph corresponds to a multiplier for a sample of the latch 44, as discussed below, the values of the discrete points on the finite impulse response being utilized in a convolution operation with the "Bar" waveform to perform the digital filtering.

Figure 4D:
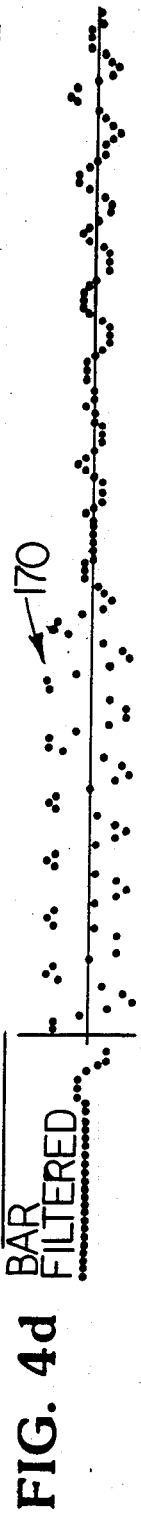

The Bar signal 95 is input through a buffer 120 to a shift register 121 comprised of three integrated circuits 122, 124 and 126, each containing six individual D flip flops. The Q output of each D flip flop is connected to the D input of the next D flip flop in sequence. The composite shift register has eighteen bits or D flip flops; however, only the first seventeen flip flops 128–144 are utilized. The bar signal 95 is input to the flip flop 128 via the buffer 120 and is sequentially clocked through the composite shift register by the clock signal output 46, sample by sample. For each stroke of the clock signal output and corresponding incremental movement of the bar signal 95 through the composite shift register 121, the aforesaid convolution operation is carried out to implement the digital filtering. Points $128^1$–$144^1$ on the finite impulse response graph correspond to the Q outputs of flip flops 128–144, respectively. As indicated by the graph of FIG. 7(a), the point $128^1$ indicates a coefficient of plus one so that a simple non-altered Q output of flip flop 128 is supplied through a conductor 147 to an EPROM 160 to provide the proper addend. The point $129^1$ in the finite impulse response graph indicates a coefficient of zero so that the corresponding Q output 129 is not tapped. Similarly, the point $130^1$ on the finite impulse response graph indicates a coefficient of zero so the corresponding Q output 130 is not tapped. The point $131^1$ indicates a coefficient of minus one so that the corresponding Q output 130 is inverted by an inverter 150. Similarly, the points $132^1$ and $133^1$ indicate a coefficient of minus 1 so the corresponding Q outputs 132 and 133 are inverted by inverters 150, 150. The other Q outputs are treated by the corresponding multiplier indicated by the finite impulse response graph in the same manner except that the plus two multiplier $136^1$ is provided by two conductors 148, 149 stemming from the Q output 136. The summation of the convolution process is performed by the EPROM 160. By way of example, the EPROM 160 comprises integrated circuit model 2732A and is programmed to sum each of its inputs, which inputs are supplied by the Q outputs of flip flops 128–144 via the appropriate multiplier. It should be noted that the Q output 136 is supplied to two inputs 162, 164 of the EPROM 160 via conductors 148 and 149 to provide the multiplier of plus two indicated by the point $136^1$ on the finite impulse response graph. The sums computed by the EPROM 160 are output in digital form via four output ports 166–169 to provide a four bit output. Such an output when plotted yields a Bar Filtered waveform 170 illustrated in FIG. 4(d). The Bar Filtered waveform 170 exhibits a fundamental frequency corresponding to that of the band pass filter 100 and the spacing between the bars of the code 12, and yields a sine wave of maximum amplitude when the bar signal 95 corresponding to the bar elements 14, 16 passes through the composite shift register. The peak amplitude of the sign wave representing the bar elements is larger than both the peak amplitude of the filter response representing the container imperfection 4 and the filter response representing the lettering because the Bar signal square wave representing the bar elements has its energy concentrated at the center frequency of the filter whereas the Bar signal representing the imperfection 4 and the lettering 6, 8 and 9 contains substantial energy at other frequencies. The output of the EPROM 160 indicates an instantaneous peak amplitude when the portion of the bar graph 95 corresponding to the bar elements 14, 16 is contained in the composite shift register at the location corresponding to alignment of the bar elements with the positive going portions of the impulse response. Such an event is illustrated by the superpositions of FIG. 7(b) and FIG. 7(a). All of the points on the finite impulse response graph which are greater than or equal to zero coincide with a positive point on the Bar signal graph 95 and all of the points on the finite impulse response graph which are less than or equal to zero coincide with a negative point on the Bar signal graph 95 so that when such bar signal points are multiplied by the corresponding finite impulse response coefficient, each partial sum and the convoluted output is maximum. In the illustrated example, such a maximum convoluted output 169 is plus six as indicated by the Bar Filtered graph 170. One clock signal later, the Bar signal 95 is not so aligned with the optimum coefficient indicated by the finite impulse response filter so that the corresponding, convoluted output 171 of the EPROM 160 is less, in the illustrated example only plus five. Four clock signals after the aforesaid maximum response, the Bar signal 95 in the composite shift register 121 is 180° out of phase with the finite impulse response so that the positive points of the bar signal 95 within the shift register line up with the negative coefficients and the negative points of the bar signal 95 in the composite shift register line up with the positive coefficients so that the resulting, instantaneous convoluted output 123 is minimum, in the illustrated example, minus six. The Bar Filter waveform 170 corresponding to the stray mark 4 and lettering 6, 8 and 9 on the container 11 has lesser peak-to-peak amplitudes than the portions corresponding to the bar elements 14, 16 because the portion of the bar signal graph 95 corresponding to the stray mark and lettering does not have the same fundamental frequency as the digital filter finite impulse response and therefore, was attenuated by it.

Figure 8A:
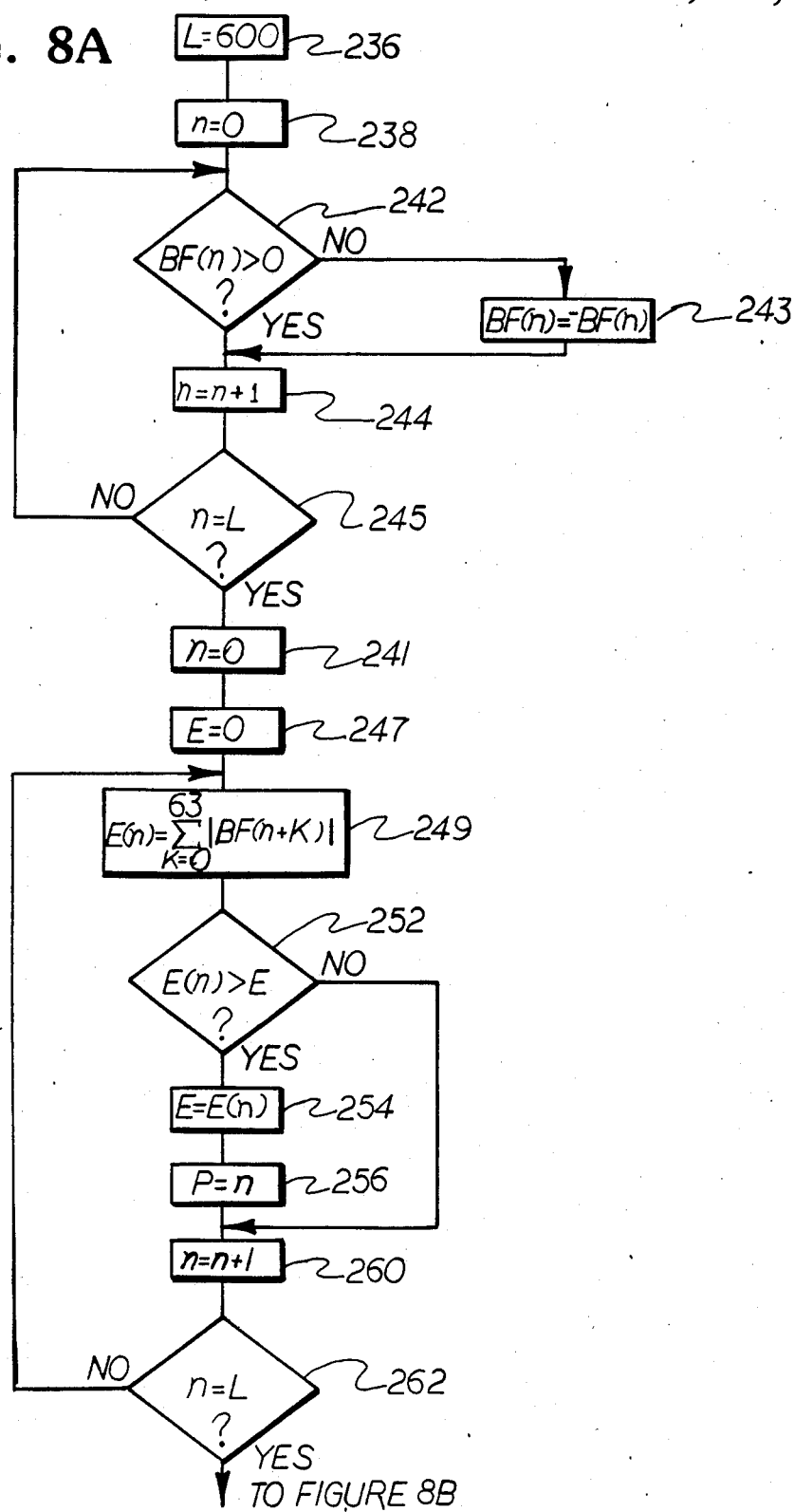
FIGS. 8a and 8b are flow charts illustrating a process for locating and reading the code of FIG. 1 utilizing the processor of FIG. 3.
Figure 8B:
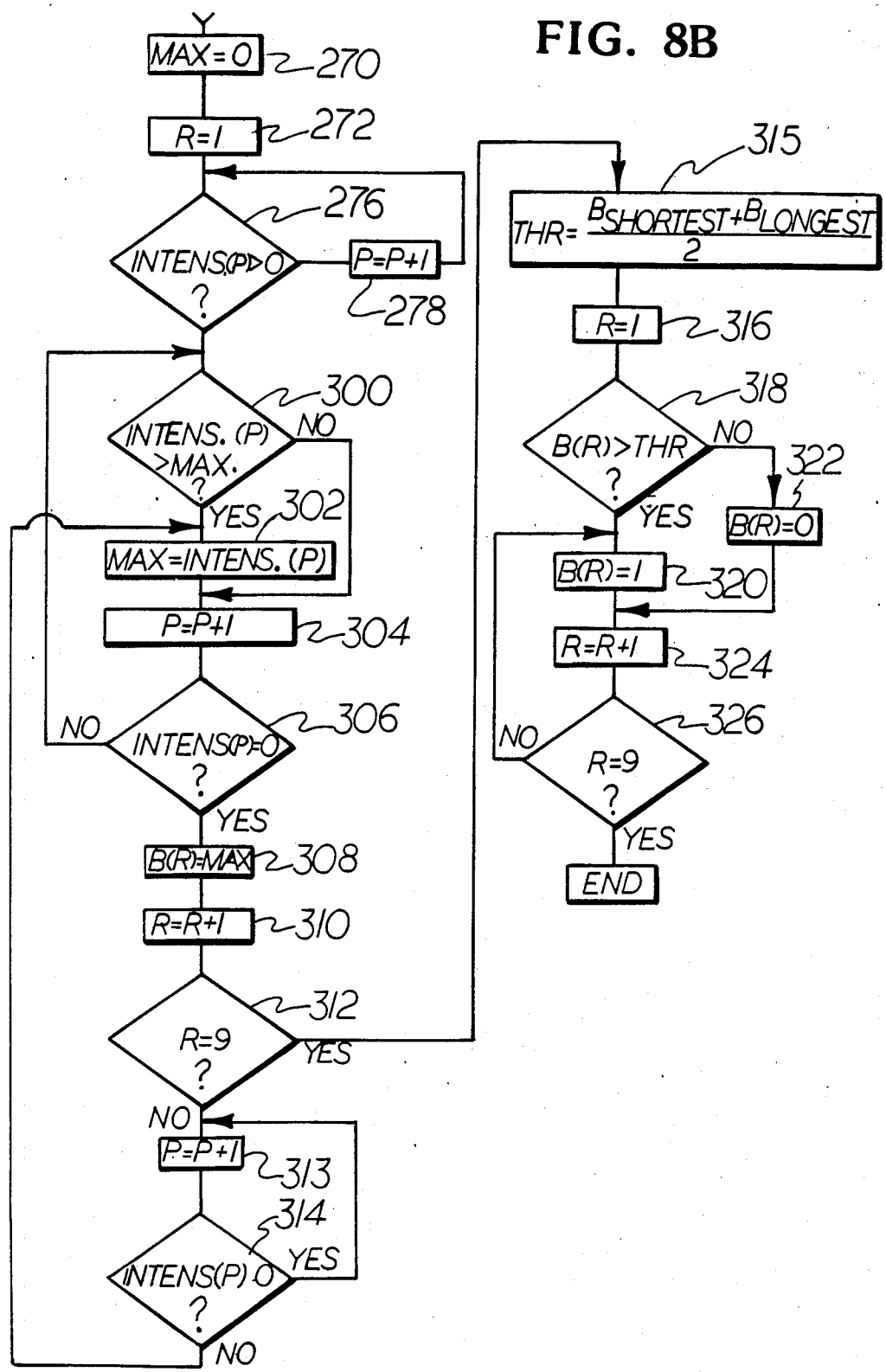

Next, the microprocessor 130 proceeds to locate the bar code portion of the Bar Filter wave form by locating the portion of maximum energy in the manner illustrated by the flow chart of FIG. 8. For reasons made apparent below, the microprocessor 124 first sets parameters L=600 (step 236) and n=0 (step 238). Parameter L represents the total number of samples per 360° of container rotation and n represents the current sample. By way of example, there are 600 of such samples created for each rotation of the container 11. Then, the microprocessor inverts each of the current negative samples (step 243), increments the sample number (step 244) and, until the six hundredth sample (step 245), repeats the inversion process for the remaining negative samples. Then, for reasons discussed below, the microprocessor resets the parameter n equal to zero (step 246), and sets a parameter E equal to zero (step 247). Next, the microprocessor determines an "Energy" value associated with each sample n (step 249). The value of the energy associated with a particular sample n equals the sum of the absolute values of the sign corrected Bar Filtered samples at n through n plus 63. Because each bar code contains eight bars 14, 16 and there are eight samples from bar to bar, an entire code requires sixty-four samples. Consequently, when the sample n is the first sample of the bar code, the n sample and the next sixty-three samples define the bar filter graph corresponding to the bar code and such energy value is maximum because the bar filtered portion corresponding to the sixty-four samples has the highest amplitudes. This allows the microprocessor to locate the code.

Because the sampling of the container begins at a random location on the container, generally the first sample does not correspond to the beginning of the bar code 12 so that further computations must be made to determine the first sample of the bar code. To this end, after the energy value associated with the first sample is computed according to step 249, the energy value is compared to the parameter E which was previously set to zero. Assuming that the energy value is greater than zero (step 252), the parameter E is reset with the first energy value (step 254) and a parameter P is set to the sample number of the current parameter E which sample number represents the sample number of the greatest energy value located so far. Next, the sample n is incremented by one (step 260) and because the sample n has not yet reached the number 600 (step 262) the energy value at the next sample is determined (step 249). It should be noted that the computations indicated by the step 249 for the energy values are facilitated by use of a recursive equation:

$$\text{Energy }(n) = \text{Energy }(n-1) + ABS \text{ Bar Filter} (n+63)] - ABS \text{ Bar Filter }(n-1)]$$

In other words, the computation for each value of E(n) equals the previous value of the Energy plus a K equals sixty-three addend of the current Energy value minus the K equals zero addend of the previous Energy value.

Figure 4E:
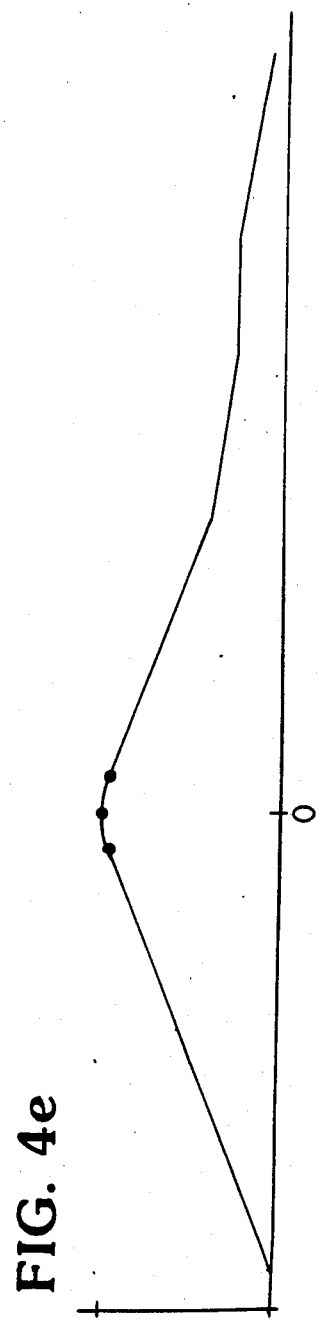
FIG. 4(e) illustrates results of the processing of the circuitry of FIG. 3.

After the next energy value is computed, E(n), it is compared to the parameter E (step 252) and if it is greater than the parameter E, the parameter E is reset to the current energy value, E(n), (step 254) and the parameter P is set to the sample number of the current energy value (step 256). The steps 249–262 are carried out a total of 600 times and after the 600th iteration, the parameter E equals the maximum energy value and the parameter P is set to the corresponding sample number. Generally, the final setting for the parameter P is approximately the first sample number of the bar code portion of the bar filtered graph 170. Thus, the code 12 has been located. The energy as a function of sample number is plotted in FIG. 4(e).

Next, the microprocessor 125 proceeds to actually read the code now that the microprocessor has located it. For reasons apparent from the following description, the microprocessor sets a parameter "Max" equal to zero and a parameter "R" equal to one (steps 270–274). Next, the microprocessor attempts to precisely locate the first sample of the first bar of the code, in the illustrated example bar element 16a. To this end, the microprocessor determines whether the intensity value at sample P equals zero (step 276). If so, the microprocessor has not yet located the first sample representing the bar and proceeds to increment P by one (step 278) and determine whether the intensity value at the new sample P is equal to zero (step 276). When the microprocessor locates the first bar 16a in the code, the corresponding intensity value will be greater than zero, and the microprocessor will proceed to compare the intensity value to the "Max" value which was set in step 270 (step 300). Because the respective intensity is greater than the initial value of "Max", the microprocessor proceeds to substitute the intensity value at this sample for the parameter Max (step 302). Then, the microprocessor proceeds to update the sample number, P, (step 304).

Next, the microprocessor determines whether the intensity value at the present updated sample number is equal to zero (step 306). If not, this indicates another sample in the same bar and the microprocessor proceeds to step 300 to determine whether the intensity value at the current sample point is greater than that of the previous sample point. If so, the microprocessor proceeds to update the parameter Max and proceed to the next sample point. If not, then the microprocessor simply proceeds to the next sample point without updating the parameter Max. The microprocessor continues in the loop steps 300–306 until all the samples of the first bar have been analyzed to determine the sample in which the most photo-diodes were activated and the intensity level of this sample is the one ultimately stored as the parameter Max to represent the intensity level for the first bar. After all the samples for the first bar have been analyzed, the intensity value of the next sample will ordinarily be zero so that step 306 will lead to step 308. In step 308, the intensity level of the first bar is set to equal the parameter Max and then the parameter R is incremented by one to indicate the next bar (step 310). Next, the microprocessor determines whether all of the bars have been analyzed yet (step 312) by comparing the incremented parameter R to the number 9. Because only one bar has been analyzed so far, R is not yet equal to nine so that the microprocessor advances to the steps 313 and 314. In the step 313, the sample number is incremented by one and then in the step 314, its intensity value is compared to zero. If the intensity value is equal to zero, this indicates a sample within the space between the first and second bars. In which case, the microprocessor loops back to the step 313 and again increments the sample parameter P. The steps 313 and 314 are repeated until the first sample of the second bar has been reached at which time the intensity level exceeds zero and the computer program branches to the steps 302-308, 300 to determine the greatest intensity level for a sample of the second bar.

The process defined by the steps 300-314 is repeated until the maximum sample length of each bar is determined, B(1)-B(8) (step 308). Then, the microprocessor compares the maximum sample lengths of each bar to a threshold (step 315). As demonstrated by the step 315, the threshold is set half way between the longest sample length representing a bar and the shortest sample length representing a bar. Next, the parameter R is reset to one (step 316) and the sample length representing the first bar is compared to the threshold (step 318). If the sample length exceeds the threshold, then a binary value of one is associated with the first bar (step 320) and if not, a binary level of zero is associated with the first bar (step 322). Next, the microprocessor increments the parameter R (step 324) to initiate the threshold comparison of the next bar and loops back through the steps 318-322 to determine whether the next bar is greater than or lesser than the threshold level. After a total of eight such iterations through the steps 318-324 have been completed and a binary level associated with each of the bars, the parameter R equals nine so that the computer program exits the loop (step 326) and concludes the code reading process.

It should be noted that the step 315 of determining the threshold between short and long bars requires that the code contain at least one short bar and at least one long bar so that this restriction is placed upon the formation of the code on the container. However, if desired, the threshold level may be preset to avoid this restriction. It should also be noted that because the threshold is custom made for each code, the microprocessor is able to read a variety of bar codes in which the short and long bar elements of each code vary in length from code to code.

After the entire code has been read, the microprocessor 125 sets a flip flop 97 which signals the microprocessor 48. The microprocessor 48 also serves as an overall supervisor of a container forming system in which the present invention is located. Accordingly, if the code 12 on the container indicates a mold number and if the supervisor microprocessor 48 has previously learned that containers produced by the associated mold are defective, the microprocessor 48 activates a rejector 350 via a one-shot 352 and a solid state relay 354.

The microprocessor 48 is also involved with trouble shooting the processing circuitry 50 and to this end, reads the outputs of the latch 44 via buffers 401, 401.

By the foregoing, code locating and reading apparatus and processes have been disclosed. However, numerous modifications and substitutions may be made without deviating from the scope of the invention. For example, any of the aforesaid hardware components could be replaced by software and vice versa. Also, to generate the bar signals illustrated in FIG. 4(c), instead of using the code converter 70, the buffer 92 and the comparator 94, a ten input OR gate could be substituted, its inputs being connected to the outputs of the latch 44, and the output of the OR gate providing the Bar signal. It may be desirable, in this embodiment to use CMOS logic which yields selectable plus and minus binary voltage levels. Also, other kinds of codes can be located by the present invention provided that the code when processed through the bar-filter stage, yields substantial energy at a fundamental frequency. Also, other types of code reading algorithms and circuitry can be substituted for the ones illustrated in steps 270-326 after the code is located, such as the ones illustrated in the aforesaid patent application Ser. No. 648,229 or the aforesaid U.S. Pat. No. 4,524,270. Therefore, the invention has been disclosed by way of illustration and not limitation and reference should be made to the following claims to determine the scope of the present invention.

What is claimed is:

1. A process for locating a code on a carrier, said code comprising a plurality of substantially uniformly spaced elements, said process comprising the steps of:
   scanning said carrier to yield electrical signals having a first portion representing a region on said carrier containing said code and a second portion representing other regions on the carrier,
   processing said electrical signals to yield an electrical waveform having a first waveform portion which corresponds to said first portion of said electrical signals and has a fundamental frequency corresponding to the distance from element to element of said code, and a second waveform portion which corresponds to said second portion of said electrical signals and does not have said fundamental frequency, and
   filtering said electrical waveform to attenuate said second portion relative to said first portion.

2. A process as set forth in claim 1, wherein
   said step of filtering said electrical waveform comprises the step of passing said electrical waveform through a band pass filter centered at said fundamental frequency.

3. A process as set forth in claim 2, wherein
   the carrier is a cylindrical portion of a container,
   the step of scanning said carrier comprises the steps of rotating said container and optically scanning said code during rotation, the code elements being circumferentially arranged on said cylindrical portion of said container, and
   said fundamental frequency of said first portion of said electrical waveform corresponds to the speed of rotation of the surface of said cylindrical portion divided by the center spacing of said code elements.

4. A process as set forth in claim 1 for reading a bar code, the bar elements having either of two lengths and being parallel to one another, wherein
   said step of scanning said carrier comprises the steps of illuminating said carrier and reading the reflections from the bars sequentially with a linear array of photosensitive elements, the reflections from each of the bar elements being approximately aligned with said linear array during reading to develop a sample of the said electrical signals, and
   the processing step comprises the step of counting the number of photosensitive elements in the linear array which are illuminated by the reflection from each of said bars.

5. A process as set forth in claim 4 wherein said processing step further comprises the steps of
   comparing the number of optical sensors in the linear array which are periodically activated by reflections from the carrier to a threshold level, and
   when said number exceeds the threshold level generating a first binary level signal and when said count is less than the threshold level, generating a second binary level signal, said electrical waveform being comprised of said first and second binary level signals.

6. A process as set forth in claim 1, further comprising the step of
comparing the magnitude of said first portions of said electrical waveform after filtering to the magnitude of said second portion of said electrical waveform after filtering to distinguish said first portion of said electrical signal waveform from said second portion of said electrical waveform and thereby identify the location of said code on said carrier.

7. A process as set forth in claim 1, wherein
after filtering, said first portion of said electrical waveform has a greater energy then said second portion of said electrical waveform, and further comprising the step of
comparing the energy of said first portion of said electrical waveform after filtering to said second portion of said electrical waveform after filtering to distinguish said first portion corresponding to said code from said second portion.

8. A process as set forth in claim 7, wherein the step of comparing the energy of said first portion of said electrical waveform after filtering to the energy of said second portion of said electrical waveform after filtering comprises the steps of
summing the absolute value of samples of the filtered electrical waveform in a multiplicity of intervals and determining the interval in which the resulting summation is the largest, said interval of largest resulting summation corresponding to said first portion of said electrical waveform and said code.

9. A process as set forth in claim 1, further comprising the steps of
storing code data derived from said first portion of said electrical signals and other data derived from said second portion of said electrical signals,
determining that the first portion of said electrical waveform corresponds to said code data based on the results of the filtering step, and
reading the code data.

10. Apparatus for reading a code on a carrier, said code comprising a plurality of substantially uniformly spaced elements, said apparatus comprising:
means for scanning said carrier to yield electrical signals having a first portion representing a region on said carrier containing said code and a second portion representing another region on said carrier,
means for processing said electrical signals to yield an electrical waveform having a first waveform portion which corresponds to said first portion of said electrical signals and has a fundamental frequency corresponding to the center spacing of the elements of said code and a second waveform portion which corresponds to said second portion of said electrical signals and does not have a fundamental frequency which corresponds to the spacing between the elements of said code, and
means for filtering said electrical wareforms to attenuate said second waveform portion relative to said first waveform portion.

11. An apparatus as set forth in claim 10 for reading a bar code, the bars having either of two lengths and being substantially parallel to one another, wherein
said means for filtering comprises a band pass filter centered at said fundamental frequency.

12. An apparatus as set forth in claim 10, further comprising:
means for comparing the energy of said first waveform portion after filtering to the energy of said second waveform portion after filtering to distinguish the first waveform portion from the second waveform portion.

13. An apparatus as set forth in claim 12, further comprising:
means for correlating an output of the comparison means to said first portion of said electrical signals to locate said first portion of said electrical signals.

14. An apparatus as set forth in claim 10 wherein:
said scanning means comprises a linear array of optical sensors which receive optical reflections from each of the code elements, and
said processing means comprises means for generating a square wave corresponding to said code, said square wave exhibiting one binary level corresponding to instants when said linear array views reflective code elements and the other binary level corresponding to instants when said linear array views non-reflective regions of said carrier, said square wave forming said first waveform portion.

15. An apparatus as set forth in claim 14, wherein the means for generating a square wave also generates said second waveform portion in which said one binary level corresponds to instants when said linear array views reflective non-code regions of said carrier and the other binary level corresponds to instants when said linear array views non-reflective regions of said carrier.

16. An apparatus as set forth in claim 11 further comprising:
code reading means for reading the outputs of said counting means corresponding to said first portion of said electrical signals to determine the information of said bar code.

17. An apparatus as set forth in claim 10 wherein:
said scanning means provides a plurality of scan samples per code element and comprises a linear array of photosensitive elements, the number of elements being activated during each scanning sample indicating the length of said code elements, and
said filtering means comprises a digital band pass filter connected to the output of said counting means and adapted to convolve finite impulse response coefficients with the sample outputs of said counting means.

18. Apparatus for reading a bar code on a carrier, said bar code comprising a plurality of substantially uniformly spaced bars of at least two different lengths, said apparatus comprising:
means for scanning the carrier and generating an electrical waveform having a first set of waveform signals which correspond to said code elements and occur at approximately equal time intervals and a second set of waveform signals which correspond to other regions on said carrier and do not occur at said time intervals, and
means for distinguishing said first set of waveform signals from said second set of waveform signals based on the frequency distributions of said first and second sets of waveform signals.

19. Apparatus as set forth in claim 18, wherein
the scanning and generating means sequentially scans the bars of the code, and the interval between signals of said first set of waveform signals corresponds to the time interval between scans of adjacent bars of the code.

* * * * *